United States Patent
Nahumi et al.

(10) Patent No.: US 10,264,102 B2
(45) Date of Patent: Apr. 16, 2019

(54) SYSTEM, METHODS AND COMPUTER READABLE MEDIUM FOR AUGMENTED PERSONALIZED SOCIAL NETWORK

(71) Applicants: Aaron Nahumi, Tel Aviv (IL); Michal Avni, Tel Aviv (IL); Elad Magal, Ramat Hasharon (IL)

(72) Inventors: Aaron Nahumi, Tel Aviv (IL); Michal Avni, Tel Aviv (IL); Elad Magal, Ramat Hasharon (IL)

(73) Assignee: Aaron Nahumi, Tel Aviv (IL)

( * ) Notice: Subject to any disclaimer, the term of this patent is extended or adjusted under 35 U.S.C. 154(b) by 674 days.

(21) Appl. No.: 13/666,133

(22) Filed: Nov. 1, 2012

(65) Prior Publication Data
US 2013/0298030 A1 Nov. 7, 2013

Related U.S. Application Data

(60) Provisional application No. 61/554,992, filed on Nov. 3, 2011.

(51) Int. Cl.
*G06F 15/18* (2006.01)
*H04L 29/06* (2006.01)
*H04W 4/04* (2009.01)
*H04W 4/21* (2018.01)

(52) U.S. Cl.
CPC ............ *H04L 67/42* (2013.01); *H04W 4/04* (2013.01); *H04W 4/21* (2018.02)

(58) Field of Classification Search
CPC ............ G06F 17/243; G06F 17/3028; G06F 17/30867; G06F 17/30; G06F 17/30899; H04L 67/42; H04W 4/04; H04W 4/21
USPC ................................. 715/733, 745, 789
See application file for complete search history.

(56) References Cited

U.S. PATENT DOCUMENTS

| | | | | |
|---|---|---|---|---|
| 9,201,952 | B1* | 12/2015 | Chau ................. | G06F 17/30867 |
| 9,430,570 | B2* | 8/2016 | Button ............. | G06F 17/30867 |
| 2003/0126250 | A1* | 7/2003 | Jhanji .................... | G06Q 30/02 |
| | | | | 709/223 |
| 2003/0177120 | A1* | 9/2003 | Stodolsky .............. | G06Q 30/02 |
| 2006/0036462 | A1* | 2/2006 | King .................. | H04N 1/00244 |
| | | | | 705/1.1 |

(Continued)

*Primary Examiner* — Scott T Baderman
*Assistant Examiner* — Hassan Mrabi
(74) *Attorney, Agent, or Firm* — Reches Patents

(57) ABSTRACT

A non-transitory computer readable medium for displaying augmented personalized information to a user, the non-transitory computer readable medium stores instructions for: collecting collected information from a plurality of information sources out of social networks, sensors, factual static sources, geolocation sources, real time sources, user provided information; detecting, out of the collected information, relevant information that is relevant to a user based upon a profile of the user, a relevant point of time and a relevant location; processing the relevant information through a structuring content process to provide specific augmented personalized information that is compatible to an augmented personalized dynamic space of the user; and transmitting to a device of the user the specific augmented personalized information, the specific augmented personalized information causes to the device of the user to display to the user the specific augmented personalized information within the augmented personalized dynamic space of the user.

25 Claims, 12 Drawing Sheets

(56) References Cited

U.S. PATENT DOCUMENTS

| | | | |
|---|---|---|---|
| 2008/0091786 A1* | 4/2008 | Jhanji | G06Q 30/0259 709/206 |
| 2011/0106736 A1* | 5/2011 | Aharonson | G06Q 10/109 706/12 |
| 2011/0258049 A1* | 10/2011 | Ramer et al. | 705/14.66 |
| 2011/0264569 A1* | 10/2011 | Houseworth | G06Q 10/10 705/31 |
| 2012/0317198 A1* | 12/2012 | Patton | G06Q 10/10 709/204 |

\* cited by examiner

Retrieving the relevant point of time and the relevant location from time and location sensors. 1002

Retrieving from the augmented personalized dynamic space of the user at least one of relevant time and the relevant location which is virtual. 1004

Randomly selecting at least one of the relevant point of time and the relevant location. 1006

Collecting collected information obtained from public profiles of multiple users. 1012

Constantly collecting collected information from local and global cyber space and from sensors that sense physical attributes of an environment of the user. 1014

Detecting of relevant information to the user in response to a correlation between a profile of the user and at least public profiles of other users. 1022

Determining that uses share a field of interest based upon a similarity between profiles of the users and locations that are relevant to the users. 1024

Determining a scope, strength, relevancy and priority of attributes of the user profile based on personal sensors. 1028

FIG. 11

Transmitting to the device of the user specific augmented personalized information that will cause the device of the user to suggest services proximate to the location of interest and in correlation with the profile of the user. 1042

Transmitting to the device of the user specific augmented personalized information that will cause the device of the user to provide an indication to the user that at least one other user that is located at a vicinity of the user has a field of interest that is similar to a field of interest of the user. 1044

Transmitting to device of the user specific augmented personalized information that causes the device of the user to provide an event notification, wherein the event notification is sent to each user that is proximate to a location of the event and has a profile that indicates that the event is related to a field of interest of the user. 1046

FIG. 12

SYSTEM, METHODS AND COMPUTER READABLE MEDIUM FOR AUGMENTED PERSONALIZED SOCIAL NETWORK

RELATED APPLICATIONS

This patent application claims the priority of U.S. provisional patent application Ser. No. 61/554,992, filing date Nov. 2, 2011 which is incorporated herein by reference.

BACKGROUND

The worldwide users activities through the world wide web, including but not limited to, through social networks, other Users' information and data, including but not limited to, their profiles or augmented space, or cloning wholly or partially their identity, profile or augmented space, etc. and other different sources of passive, active and dynamic data and information—have created the so called cyberspace which is intact—partially or fully—from the individual user(s) private physical and tangible world, reflected, inter alia, in real time and with a linkage to the real time geolocation/location.

SUMMARY

According to an embodiment of the invention there may be provided a non-transitory computer readable medium for providing, displaying, etc. augmented personalized information to a user, the non-transitory computer readable medium stores instructions for: collecting collected information from a plurality of information sources, including but not limited to, social networks, sensors, factual static sources, geolocation/location sources, real time sources, user provided information; detecting, out of the collected information, relevant information that is relevant to a user based upon a profile of the user, a relevant point of time and a relevant geolocation/location; processing the relevant information through a structuring content process to provide specific augmented personalized information that is compatible to an augmented personalized static, dynamic, virtual, etc., space of the user; and transmitting to a device of the user the specific augmented personalized information, the specific augmented personalized information causes to the device of the user to display, provide or otherwise to the user the specific augmented personalized information within the augmented personalized static, dynamic, virtual, etc. space of the user and/or other users.

According to an embodiment of the invention there may be provided a method for displaying, providing or otherwise augmented personalized information to a user, the method may include collecting, by a computerized system, collected information from a plurality of information sources out of social networks, sensors, factual static sources, geolocation/location sources, real time sources, user provided information; detecting, out of the collected information and by the computerized system, relevant information that is relevant to a user based upon a profile of the user, a relevant point of time and a relevant geolocation/location; processing, by the computerized system, the relevant information through a structuring content process to provide specific augmented personalized information that is compatible to an augmented personalized dynamic space of the user; and transmitting to a device of the user the specific augmented personalized information, the specific augmented personalized information causes to the device of the user to display to the user the specific augmented personalized information within the augmented personalized dynamic space of the user.

According to an embodiment of the invention there may be provided a computerized system for displaying augmented personalized information to a user, the computerized system may include a collection module for collecting collected information from a plurality of information sources, including but not limited to, social networks, sensors, factual static sources, geolocation/location sources, real time sources, user provided information; a detector for detecting, out of the collected information, relevant information that is relevant to a user based upon a profile of the user, a relevant point of time and a relevant geolocation/location; a processor for processing the relevant information through a structuring content process to provide specific augmented personalized information that is compatible to an augmented personalized static, dynamic, virtual or otherwise space of the user; and a transmitter for transmitting to a device of the user the specific augmented personalized information, the specific augmented personalized information causes to the device of the user to display to the user the specific augmented personalized information within the augmented personalized static, dynamic, virtual or otherwise space of the user and/or other users.

According to an embodiment of the invention there may be provided a non-transitory computer readable medium for displaying augmented personalized information to a user, the non-transitory computer readable medium may store instructions for: collecting collected information from a plurality of information sources out of social networks, sensors, location sources, real time sources, user provided information; detecting, out of the collected information, relevant information that is relevant to a user based upon user characteristics, a relevant point of time and a relevant location; processing the relevant information through a structuring content process to provide specific augmented personalized information that is compatible to an augmented personalized dynamic space of the user; and transmitting to a device of the user the specific augmented personalized information, the specific augmented personalized information causes to the device of the user to display to the user the specific augmented personalized information within the augmented personalized dynamic space of the user.

The non-transitory computer readable medium may store instructions for retrieving the relevant point of time and the relevant location from time and location sensors.

At least one of the relevant point of time and the relevant location is virtual and is retrieved from the augmented personalized dynamic space of the user.

The user profile may include a private profile and a public profile, the public profile is accessible to other users.

The user profile may include a private or limited profile and a public profile, wherein the public profile is accessible to other users that have similar public profiles to the public profile of the user.

The non-transitory computer readable medium may store instructions for providing collected information obtained from public profiles of multiple users.

The non-transitory computer readable medium may store instructions for detecting of relevant information to the user in response to a correlation between a profile of the user and at least public profiles of other users.

The non-transitory computer readable medium may store instructions for constantly collecting the collected information from local and global cyber space and from sensors that sense physical attributes of an environment of the user.

The non-transitory computer readable medium may store instructions for randomly selecting at least one of the relevant point of time and the relevant location.

The non-transitory computer readable medium may store instructions for transmitting to the device of the user the specific augmented personalized information, the specific augmented personalized information causes to the device of the user to suggest to the user services proximate to the location of interest and in correlation with the profile of the user.

The non-transitory computer readable medium may store instructions for randomly selecting at least one of the relevant point of time and the relevant location.

The relevant location comprising a path between a target location to a destination location.

The non-transitory computer readable medium may store instructions for transmitting to the device of the user the specific augmented personalized information, the specific augmented personalized information causes to the device of the user to provide an indication to the user that at least one other user that is located at a vicinity of the user has a field of interest that is similar to a field of interest of the user.

The non-transitory computer readable medium may store instructions for determining that uses share a field of interest based upon a similarity between profiles of the users and locations that are relevant to the users.

The non-transitory computer readable medium may store instructions for transmitting to devices users specific augmented personalized information tailored to each of the users, the specific augmented personalized information of each user causes a device of the user to provide an event notification, wherein the user are proximate to a location of the event and having profiles that indicate that the event is related to a field of interest of the users.

The non-transitory computer readable medium may store instructions for detecting an occurrence of an event by monitoring real time local feeds, and detecting the occurrence of the event based upon a frequency of the real time local feeds or upon an inclusion of event descriptive terms in the real time feeds.

The detecting of the relevant information may include determining scope, strength, relevancy and priority of attributes of the user profile based on personal sensors.

The non-transitory computer readable medium may store instructions for transmitting to a device of another user the specific augmented personalized information of the user.

The characteristics of the user form a profile of the user.

There may be provided a method for displaying augmented personalized information to a user, the method may include: collecting, by a computerized system, collected information from a plurality of information sources out of social networks, sensors, factual static sources, geolocation sources, real time sources, user provided information; detecting, out of the collected information and by the computerized system, relevant information that is relevant to a user based upon a profile of the user, a relevant point of time and a relevant location; processing, by the computerized system, the relevant information through a structuring content process to provide specific augmented personalized information that is compatible to an augmented personalized dynamic space of the user; and transmitting to a device of the user the specific augmented personalized information, the specific augmented personalized information causes to the device of the user to display to the user the specific augmented personalized information within the augmented personalized dynamic space of the user.

The non-transitory computer readable medium may store instructions for retrieving the relevant point of time and the relevant location from time and location sensors.

At least one of the relevant point of time and the relevant location is virtual and is retrieved from the augmented personalized dynamic space of the user.

The user profile may include a private profile and a public profile, the public profile is accessible to other users.

The user profile may include a private or limited profile and a public profile, wherein the public profile is accessible to other users that have similar public profiles to the public profile of the user.

The non-transitory computer readable medium may store instructions for providing collected information obtained from public profiles of multiple users.

The method may include detecting of relevant information to the user in response to a correlation between a profile of the user and at least public profiles of other users.

The method may include constantly collecting the collected information from local and global cyber space and from sensors that sense physical attributes of an environment of the user.

The method may include randomly selecting at least one of the relevant point of time and the relevant location.

The method may include transmitting to the device of the user the specific augmented personalized information, the specific augmented personalized information causes to the device of the user to suggest to the user services proximate to the location of interest and in correlation with the profile of the user.

The method may include randomly selecting at least one of the relevant point of time and the relevant location.

The relevant location comprising a path between a target location to a destination location.

The method may include transmitting to the device of the user the specific augmented personalized information, the specific augmented personalized information causes to the device of the user to provide an indication to the user that at least one other user that is located at a vicinity of the user has a field of interest that is similar to a field of interest of the user.

The method may include determining that uses share a field of interest based upon a similarity between profiles of the users and locations that are relevant to the users.

The method may include transmitting to devices users specific augmented personalized information tailored to each of the users, the specific augmented personalized information of each user causes a device of the user to provide an event notification, wherein the user are proximate to a location of the event and having profiles that indicate that the event is related to a field of interest of the users.

The method may include detecting an occurrence of an event by monitoring real time local feeds, and detecting the occurrence of the event based upon a frequency of the real time local feeds or upon an inclusion of event descriptive terms in the real time feeds.

The detecting of the relevant information may include determining scope, strength, relevancy and priority of attributes of the user profile based on personal sensors.

The method may include transmitting to a device of another user the specific augmented personalized information of the user.

The characteristics of the user form a profile of the user.

There may be provided a computerized system for displaying augmented personalized information to a user, the computerized system may include: a collection module for collecting collected information from a plurality of information sources out of social networks, sensors, factual static sources, geolocation sources, real time sources, user provided information; a detector for detecting, out of the collected information, relevant information that is relevant to a user based upon a profile of the user, a relevant point of time and a relevant location; a processor for processing the relevant information through a structuring content process to provide specific augmented personalized information that is compatible to an augmented personalized dynamic space of the user; and a transmitter for transmitting to a device of the user the specific augmented personalized information, the specific augmented personalized information causes to the device of the user to display to the user the specific augmented personalized information within the augmented personalized dynamic space of the user.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIGS. 11-12 illustrates sub-stages of various stages of the method of FIG. 10, according to an embodiment of the invention.

DETAILED DESCRIPTION OF THE DRAWINGS

Figure 1:
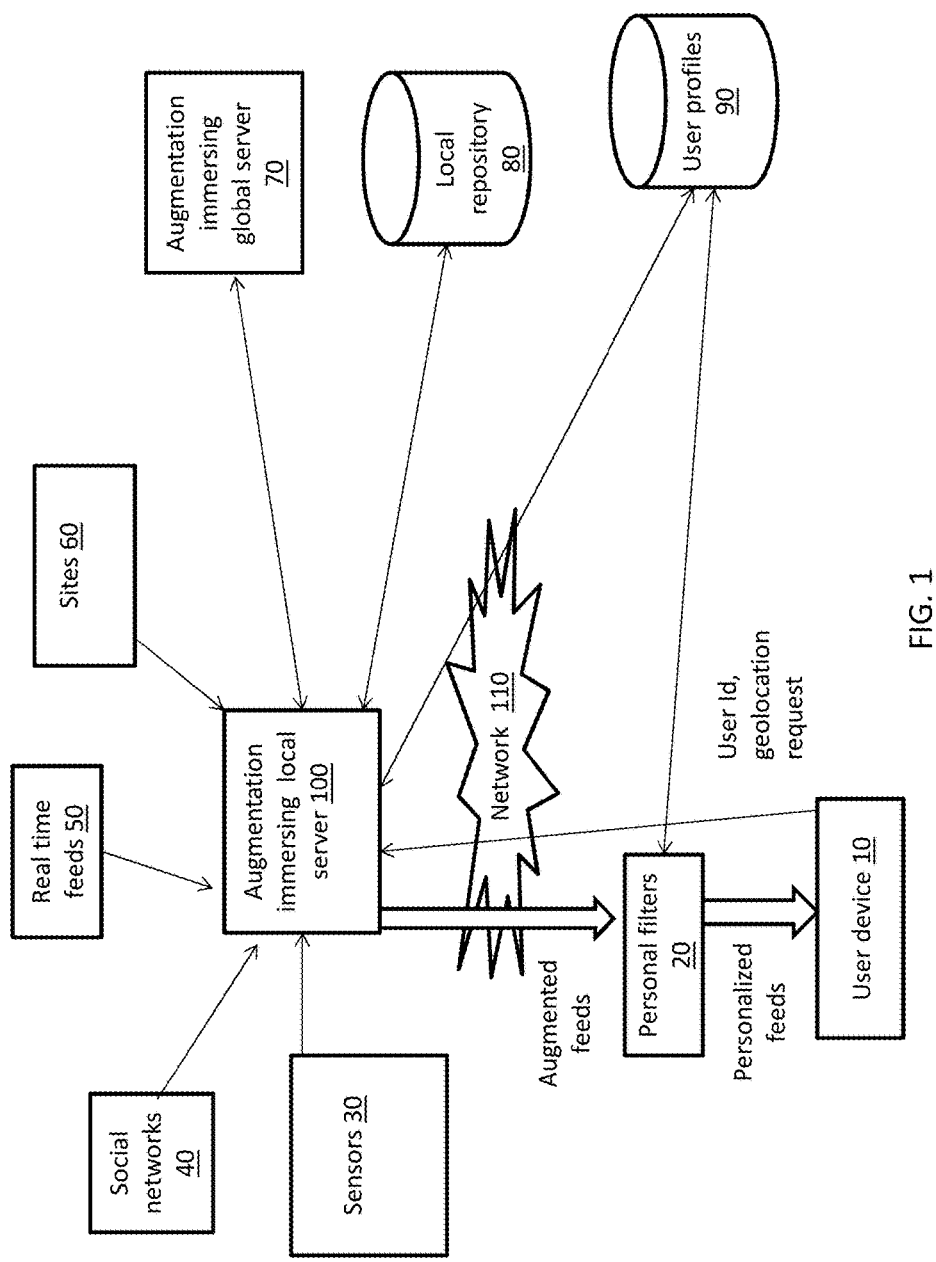
FIG. 1 illustrates a system and its environment according to an embodiment of the invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The term "geolocation" means coordinates or specific address, the term "location" means for example city or region. Geolocation can be viewed as being more accurate than a location and covers less territory. The phrase "geolocation/location" means geolocation and additionally or alternatively location.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Thus, servers can be replaced by other computerized entities or other types of apparatus that may process information and communicate with other entities.

There can be provided systems, methods and computer readable medium having full time (twenty four hours a day, seven days a week) real time integration and synergism between the general worldwide/local cyberspace and the private personalized individual user(s) physical space based, inter alia, on real time and real geolocation/location or alternatively based, on virtual time and/or virtual geolocation/location.

There are provided system, methods and computer readable medium (that is non-transitory) for augmented reality personalized social network that enable the discovery in real time of such as places, sites, events, people, activities and information, based, inter alia, on retrieved, received or structured, explicit or implicit, intention and/or objectives and/or interests and/or preferences.

Any reference to a system, method or computer readable medium shall be interpreted as a reference to each one of the system, method and computer readable medium. The computer readable medium stores instructions that once executed by a computer causes the computer to perform a method. The mentioned below system can include, inter alia, the computer. Non-limiting examples of a computer readable medium that is not transitory include any known or future type of, disk, a diskette, a magnetic tape, a storage unit and the like. In addition, any reference to the word "computer" is made, without relying on any specific identification of the computer, but which may refer to any type of apparatus, device or otherwise, including, mechanical, electronically, digital, biological, thought-transfer, human implants or combination of human organs and any type of external or internal computer, apparatus, device or otherwise.

Use characteristics are gathered and may form profiles. Profiles are generated for users and may include public profile (public fields of interest), private profile (disclosed according to predefined rules). The profiles can be generated with assistance of a user, by obtaining information about the user (for example—from social networks, data bases and other sources of information and data) or a combination thereof. These profiles can be updated dynamically and the information sent to the user can be updated in a dynamic manner. Thus different users might receive different information based upon their different profiles and relevant data such as geolocation/location and their personalized private preferences and interests.

A user can be provided with relevant information based upon a combination consists, inter alia, of his profile, real or virtual time (current time or other selected past or future points in time) and real or virtual geolocation/location (actual geolocation/location or other selected geolocation/location).

Multiple information sources of various types are processed, personalized and augmented in real time and relevant information can be sent to user devices of various types.

The system may dynamically and automatically collect, digest, filter and processes local and global data and information from different sources, such as real time feeds, social networks, data bases, environmental sensors, review sites, etc.

The processing may include or may be followed by creating user profiles and structured content in their respect, based on behavior, preferences, priorities, tendencies, activities and personal sensors, (allowing the user(s) to change and redefine the system settings manually or automatically, logically or randomly) and augments such user(s) physical space by creating for them an augmented targeted and personalized individual private space, that consists, inter alia, of the most relevant real time information, customized personal view; connecting people based on mutual interests or preferences, highlighting trends and events and creating an ambient social network.

The system, method and computer readable medium are for augmenting personalized social network and for providing an augmented personalized private space, for a singular user or plurality of users.

The system may dynamically accompany each user on an online basis during all the time, or during selected real and/or virtual time periods and/or with respect to all geolocations/locations or with respect to real and/or virtual selected geolocations/locations.

The system may automatically adjust the user virtual space based, inter alia, on any of the following: a real time and real time geolocation/location, a real time and virtual geolocation/location, a virtual real time and real time geolocation/location, or virtual real time and virtual geolocation/location, all according to user choice, automatically or third party initiative, all randomly or logically.

The geolocation/location may be static, dynamic or virtual, including particular arena, venue or moving geolocation/location.

The system may deliver content to the user by any type of computer readable medium/interface, including, inter alia, external (e.g., portable devices, physical or biological), semi-internal (e.g., hats, helmets, glasses or lenses), body implants (e.g., chips and artificial organs) and/or by other medium/interface such as means which are semi-physical, non-physical, intangible, thought conveyance, spiritual, psychological or hypnothical.

The system may provide the user with multi layer augmented personalized data, information and services.

The system may provides services, that comprise, inter alia, of the following:
  (i) Personalized and relevant to the user in all aspects (e.g., interests, preferences, relations, connections, priorities, tendencies, trusts, activities, content, recommendations, advertisements, motivations, desires, games, events, people, socializing);
  (ii) In the online context of user's real time and geolocation/location, arena or venue or by applying virtual real time and/or virtual geolocation/location arena or venue.

The system may enable a user to adjust and customize its settings (e.g., opt-in, opt-out, customization and modules), including the mixed reality or augmented reality (AR) features (allowing the user(s) to change and redefine the system settings manually or automatically, logically or randomly).

The system may provide the services by all delivery means (existing or future ones); e.g., visual, audio, video, sensation, gestures, odor, taste, multi-dimensions, any mean of thought conveyance and others.

The system can work with any underlying method. One embodiment of the method comprises of different sources and feeds such as, inter alia, the following: user private ones, social sources, commercial sources, factual variables sources, factual static sources and augmented reality (AR) sources which are real time sources and geolocation/location sources or virtual real time and/or virtual geolocation/location sources.

The system may apply a process within an application server/hub in which the non-augmented reality sources are retrieved and/or received and then pass through the following process:
  (i) Structuring process which its outcome is, inter alia, targeted and personalized;
  (ii) Integrating and structuring content process in conjunction with the augmented reality (AR) sources and feeds, which are real time sources and geolocation/location sources or virtual real time and/or virtual geolocation/location sources. The said integration and synergism is done through an intelligently and automatic online augmentation process and automatic machine learning, within the system application local and global augmentation servers network.

The server may perform the processing in an automatic manner and may include real time engines (e.g., contextual, semantic, statistical, discovery based engines) based inter alia, on discovery machine learning capabilities.

According to an embodiment of the invention users may be wrapped with a 24/7 moving space/cloud adjusted, customized and personalized according to their real time and geolocation/location, arena, venue or by applying virtual real time and/or virtual geolocation/location.

When two different people are present together in the same real time geolocation/location, but each has its own interests and selection—then each of the two will be provided with a different personalized space, consists of, inter alia, of different information and stimulation.

If, for example, various users (A and B) are interested in history and gardening (respectively) and may travel the same path, then the user A may receive personalized alerts associated with history while user B may receive personalized alerts related to gardening.

Referring to this example, more specific and detailed preferences and fields of interest can be defined. Instead of gardening other preferences and specific and detailed fields of interest may be defined and may include trees, not deciduous trees, olive trees, flowers, orchids and the like. Instead of history other preferences and specific and detailed fields of interest may be defined and may include the history of World War II, World Wars, or the impact of World War II on the geolocation/location of users A and B.

The information received by each user can be related to real time geolocation/location, his destination, to the starting point of his journey, to the entire route or a portion thereof, can be limited to a certain territory about each of these mentioned above geolocations/locations and the like. Non-limiting examples relating to the mentioned above preferences or fields of interest may include historical buildings, museums, and botanical gardens, libraries that hold history books or gardening books, and the like.

A user can define a private profile settings and parameters (and private field of interest) that are not disclosed to other users and/or a public profile (and public fields of interest) but that are disclosed to other users. A user can receive indications about users in his vicinity geolocation/locations that their public fields of interest are identical or similar to his public and/or private fields of interest or that there is any potential inter-connectivity between the users.

Similarity between for example preferences and fields of interest can be deducted from the geolocation/location of the users. Thus, users that visit a plant nursery are expected to be interested in gardening. Users that attend a sport event are expected to like sport. More populated geolocations/locations are expected to include more people that share certain preferences and fields of interest which characterized such underlying geolocation/location.

The system can assist in cases of events which occurred, ordinary, regular, irregular or deviated ones, such as social events, demonstrations, emergency cases; for example, an accident on the road or an occurrence of a heart attack. If the system will alert that at certain point of time and geolocation/location there was an incident that requires physician intervention, then the system will also notify all users having the relevant profile (defined or system deducted) located within the vicinity geolocation/location so they would be able provide assistance or wish not to be in vicinity to the relevant geolocation/location.

FIG. 1 illustrates a system and its environment according to an embodiment of the invention.

This figure illustrates various information sources, processing and storage entities and a user device. The processing entities may include personal filters 20 and an augmentation and immersing local server 100. The system can also include personal filters 20. The system can receive information from social networks 40, reel time feeds, web sites 60. The system can include (or may just receive information from augmentation) at least one of the following entities: immersing global server 70, local repository 80 and user profiles 90. These entities can be merged together, or can de different entities—as illustrated in FIG. 1. The system may communicate with the user device via network 110.

The user device 10 may be any device that allows for augmentation such as but not limited to Smartphone, tablet, goggles, contact lenses, windshield, implants, etc.

The recipient might be any such user device, located outside user's body in adjacent or internal or the user's may broadcast and/or receive all relevant information through other means which are semi-physical, non-physical, intangible, thought conveyance, spiritual, psychological or hypnotically.

A segmentation and immersing local server 100 can obtain information from: (a) Social networks 40—e.g., contact lists, privacy lists, interest groups, etc.; (b) Real time feeds 50—e.g., tweets, breaking news, Q&A, traffic updates, etc.; (c) Sensors 30—environmental sensors, such as weather, noise, pollution, etc.; (d) Web sites (sites) 60-sites that cover information relevant for the user such as events, reviews, recommendation, local news, etc.; (e) User profiles repository (user profiled) 90—personal structured profiles (gender, date of birth, status, hobbies, education, etc.), dynamic profiles (interests, expertise level, etc.); (f) Local repository 80—repository of local static information such as maps, business directories, sites, historical information, etc.

The information that can be extracted from these sources may be processed by the segmentation, immersing and augmentation local server by, inter alia, any of the following processes: (a) Social networks—extract relations, influencers, interests, topics, events, trends, etc.; (b) Real time feeds—detect and extract reviews, recommendations, trends, events and local information, etc.; (c) Sensors—normalize sensors data into measurable, comparable units, etc.; (d) Web Sites—aggregate, structure and normalize local data, etc.; (e) User profiles—retrieve non restricted user information and (f) Local repository—retrieve relevant information; (g) other users' augmented reality spaces.

The segmentation, immersing and augmentation local server 100 can perform "local" ("local" means inter alia—that is relevant to the user real time geolocation/location) processing that may include generating, for each geolocation/location a real time profile to reflect the current image of the geolocation/location, upon request the local server will start generating a real time customized stream of geolocation/location updates based on the user private and/or public dynamic profile and incoming processed data.

The processing entities (such as local and global augmentation immersing servers 70 and 100) can perform filtering and distribution processes that may include, inter alia, any of the following: (a) Global processing—generate worldwide trends and events notifications based on data from local servers; (b) Personal filtering—determine scope, strength, relevancy and priority of private and/or public profile attributes based on personal sensors such as mood, outfit, people in group, etc. and then matching, classifying, clustering while synergizing user real time and geolocation/location, user real time and virtual geolocation/location or on user virtual real time and virtual geolocation/location; (c) Distribution/feeding—submit a real time feed of relevant customized personalized localized data; (d) Receive and respond to requests—request is generated submitting a user Id/unique code and geolocation/location.

Figure 2:
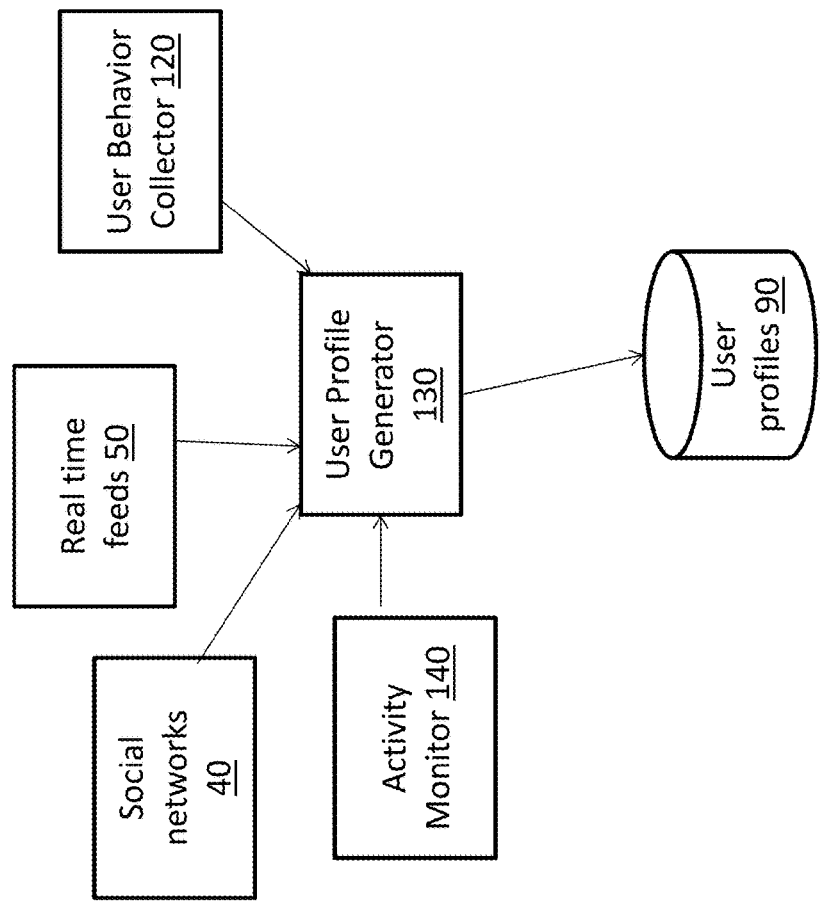
FIG. 2 illustrates a generating and updating of a user profile, according to an embodiment of the invention.

FIG. 2 illustrates a process of generating and updating of a user profile. The user profile includes, inter alia, his fields of interest and other various types' information about the user.

A user profile may be generated and updated by retrieving, aggregating and normalizing structured profiles from social networks 40. The processing entities (such as user profile generator 130) may automatically learn and build dynamic profiles based on explicit or implicit preferences, priorities and tendencies (such as document & media sharing, likes, re-tweets, etc.), behavior (such as sites, searches, selections, Q&A, quick responses, etc.), activities (such as orders, reviews, recommendations, etc.), social graphs (such as extract relations, strength, proximity, type, etc.), they can determine a scope, magnitude, strength, relevancy, ranking and priority of profile attributes and maintain a dynamic up-to-date user profile. The user profile generator 130 can store the user profiles in user profiles database 90. It can belong to the augmentation immersing local server 100 or otherwise belong to the system of FIG. 1. The user profile generator can be fed from social networks, activity monitor 140, and user behavior collection 120.

Figure 3:
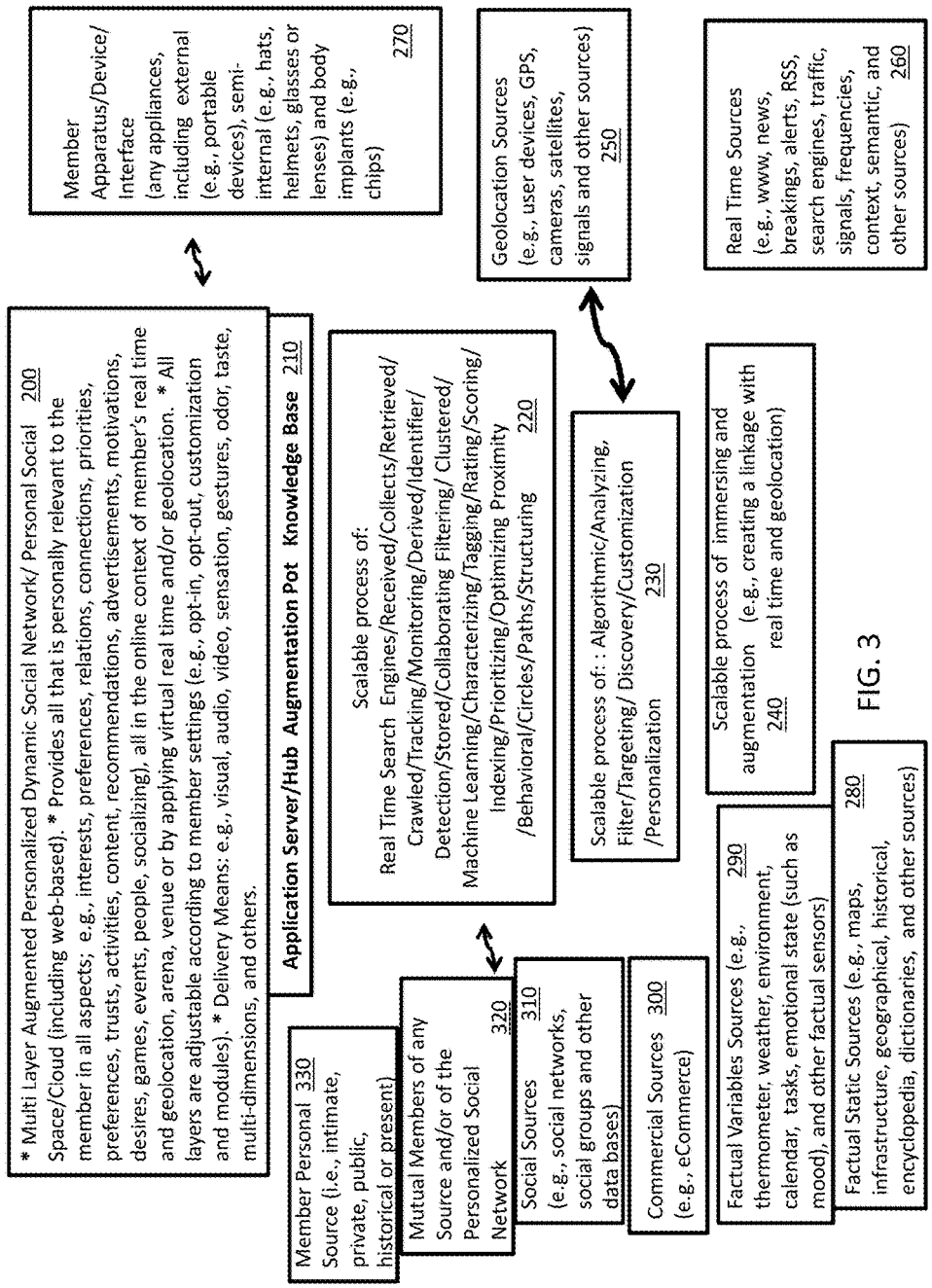
FIG. 3 illustrates various entities and processes that may interact with or affected by each other, according to an embodiment of the invention.

FIG. 3 illustrates various entities and processes that may interact one with each other, some are illustrated below:

A. Multi Layer Augmented Personalized Dynamic Social Network/Personal Social Space/Cloud (including web-based) 200. Provides all that is personally relevant to the user in all aspects (e.g., interests, preferences, relations, connections, priorities, preferences, tendencies, trusts, activities, content, recommendations, advertisements, motivations, desires, games, events, people, socializing), all in the online context of user's real time and geolocation/location, arena, venue or by applying virtual real time and/or geolocation/location. All layers are adjustable according to member settings and parameters (e.g., opt-in, opt-out, customization and modules).

B. Delivery Means: e.g., visual, audio, video, sensation, gestures, odor, taste, multi-dimensions, and others.

C. Scalable process (220) of: Real Time Search Engines/Received/Collects/Retrieved/Crawled/Tracking/Monitoring/Derived/Identifier/Detection/Stored/Collaborating Filtering/Clustered/Machine earning/Characterizing/Tagging/Rating/Scoring/Indexing/Prioritizing/Optimizing/Proximity/Behavioral/Circles/Paths/Structuring.

D. User Computer readable medium/Interface (270) (any appliances, including external (e.g., portable devices), semi-internal (e.g., hats, helmets, glasses or lenses) and body implants (e.g., chips) or by any other medium/interface such as means which are semi-physical, non-physical, intangible, thought conveyance, spiritual, psychological or hypnothical.

D. Scalable process (240) of immersing and augmentation (e.g., creating a synergetic linkage with real time and geolocation/location).

E. Scalable process (230) of: Algorithmic/Analyzing, Filter/Targeting/Discovery/Customization, Factual Static Sources (e.g., maps, infrastructure, geographical, historical, encyclopedia, dictionaries, robotics, and other sources).

F. Geolocation/Location Sources (250) (e.g., user devices, GPS, cameras, satellites, signals and other sources by wire, wireless or otherwise).

G. User Personal Source (330) (e.g., intimate, private, public, historical or present).

H. Users (320) which are Members of same Source and/or of the Personalized Social Network I. Social Sources (310) (e.g., social networks, social groups and other data bases)

J. Factual Variables Sources (290) (e.g., thermometer, weather, environment, calendar, tasks, emotional state (such as mood), and other factual sensors).

K. Commercial sources (300) (ecommerce).

L. Factual static sources (280).

An application server/hub (210) can apply the various scalable processes (220, 230, 240) and may interact with elements 250, 260, 270, 280, 290, 300, 310, 320 and 330 to prove to various devices of the user (270) specific augmented personalized information and may maintain the multi-layer augmented personalized space (200).

There whole system described above interacts through ordered chain commands (e.g., manually, randomly, automatically and otherwise), actions and reactions each is working and activated independently in certain respects or being interacted, assisted or activated with or by other nodes, on the other end.

Figure 4:
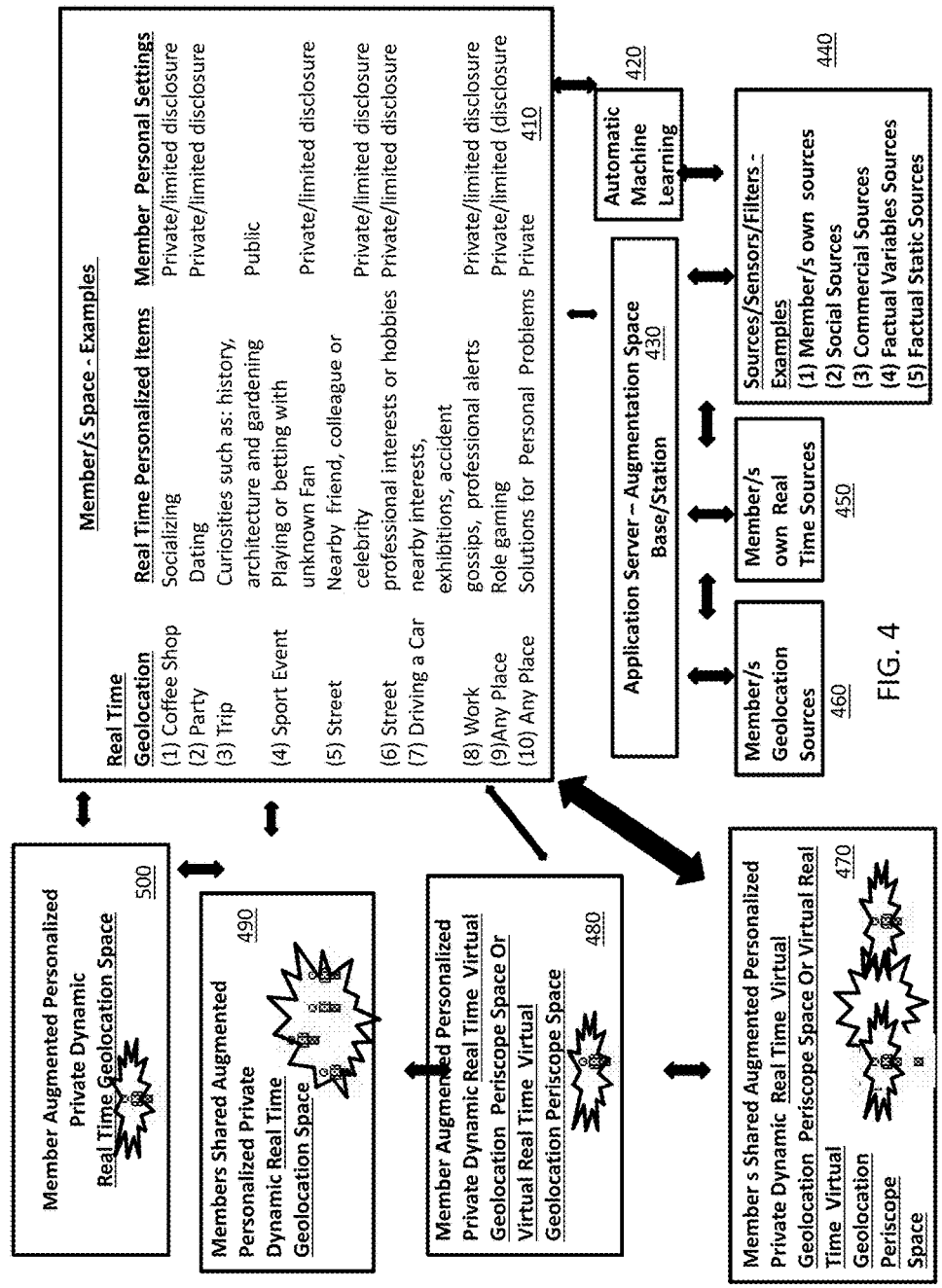
FIG. 4 illustrates various augmented personalized spaces, various processing stages that may be used to generate these augmented personalized spaces and various examples of relationships between such spaces according to an embodiment of the invention.

FIG. 4 illustrates various augmented spaces, various processing stages that may be used to generate these augmented spaces and various examples of relationships between such spaces such spaces.

Some of these elements are listed below:

A. User Augmented Personalized Private Dynamic Real Time Geolocation/Location Space 500.

B. Users Shared Augmented Personalized Private Dynamic Real Time Geolocation/Location Space 490.

C. User Augmented Personalized Private Dynamic Real Time Virtual Geolocation/Location Periscope Space or Virtual Real Time Virtual Geolocation/Location Periscope Space 480.

D. Users Shared Augmented Personalized Private Dynamic Real Time Virtual Geolocation/Location Periscope Space or Virtual Real Time Virtual Geolocation/Location Periscope Space 470.

E. Member/s Space 410 that may include (for example) the following information items:

| Real Time Geolocation/Location | Real Time Personalized Items | Member Personal Settings |
|---|---|---|
| (1) Coffee Shop | Socializing | Private/limited disclosure |
| (2) Party | Dating | Private/limited disclosure |
| (3) Trip | Curiosities such as: history, architecture and gardening | Public |
| (4) Sport Event | Playing or betting with unknown Fan | Private/limited disclosure |
| (5) Street | Nearby friend, colleague or celebrity | Private/limited disclosure |
| (6) Street | professional interests or hobbies | Private/limited disclosure |
| (7) Driving a Car | nearby interests, exhibitions, accident | |
| (8) Work | gossips, professional alerts | Private/limited disclosure |
| (9) Any Place | Role gaming | Private/limited (disclosure |
| (10) Any Place | Solutions for Personal Problems | Private |

F. Automatic Machine Learning 420.

G. Application Server—Augmentation Space Base/Station 430

H. User(s) Geolocation/Location Sources 460

I. User(s) own Real Time Sources 450

J. Application Server—Augmentation Space Base/Station 430

K. Sources/Sensors/Filters 410—(1) User(s) own sources; (2) Social Sources; (3) Commercial Sources; (4) Factual Variables Sources; and (5) Factual Static Sources.

There whole system described above interacts through ordered chain commands (e.g., manually, randomly, automatically and otherwise), actions and reactions each is working and activated independently in certain respects or being interacted, assisted or activated with or by other nodes, on the other end.

Figure 5:
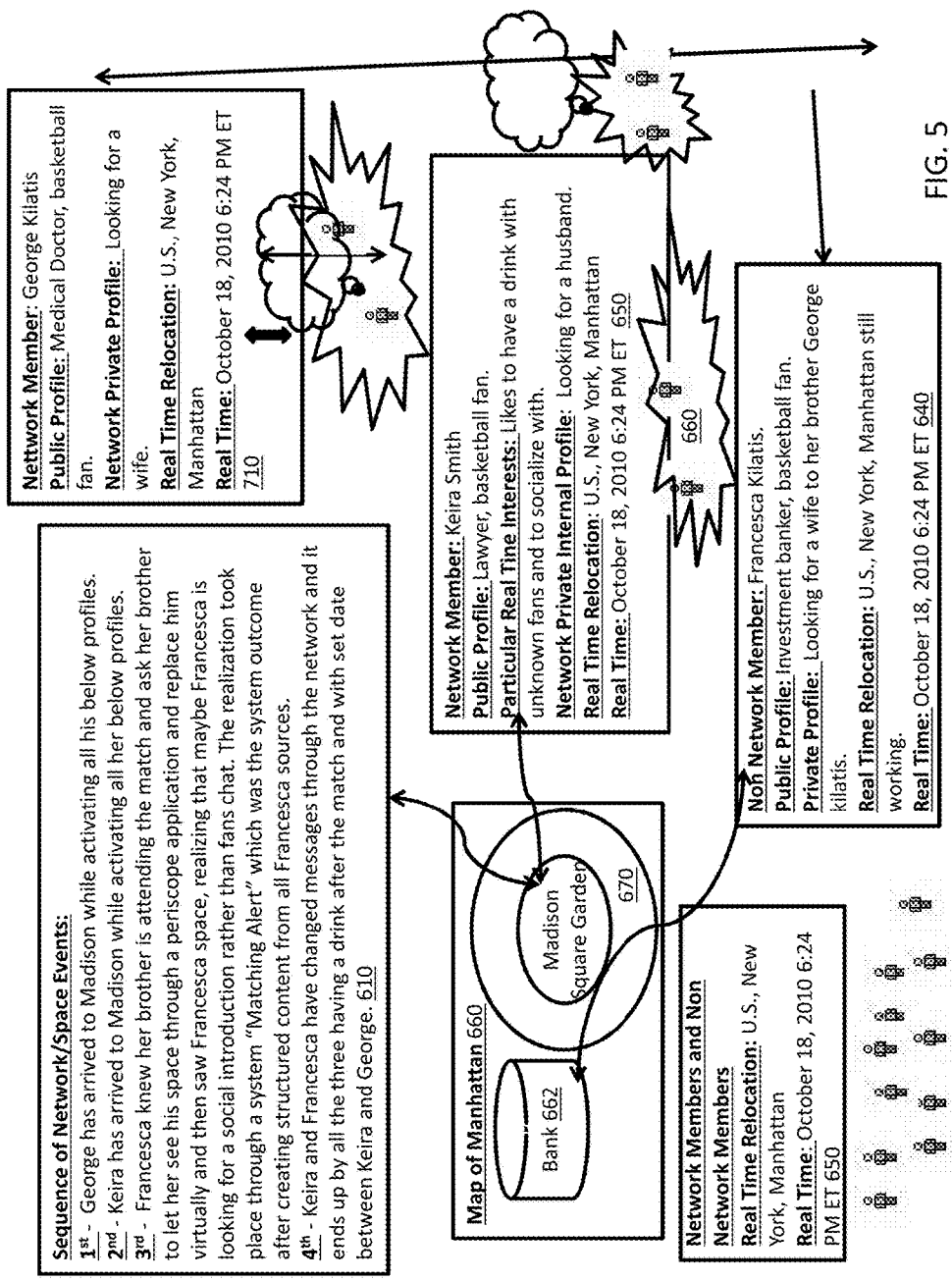
FIG. 5 illustrates public and private dynamic profiles of various users and information that is exchanged (symmetrically or asymmetrically, based upon each user profile characteristics and security policy) among users due to similarity in their fields of interest and/or geolocation/location according to an embodiment of the invention.

FIG. 5 illustrates public and private dynamic profiles of various users and information that is exchanged (symmetrically or asymmetrically, based upon each user profile characteristics and security policy) among users due to similarity in their fields of interest and real time geolocation/location.

This figure illustrates a map 600 of Manhattan 660 that includes a bank 662 and Madison square garden 670, as well as multiple people 601 located in various locations 650, 660 and 655.

The users include:

A. Network Member (610): George Kilatis; Public Profile: Medical Doctor, basketball fan; Network Private Profile: Looking for a wife; Real Time Geolocation/Location: U.S., New York, Manhattan; Real Time: Oct. 18, 2010 6:24 PM ET.

B. Network Member (630): Keira Smith; Public Profile: Lawyer, basketball fan; Particular Real Tine Interests: Likes to have a drink with unknown fans and to socialize with; Network Private Internal Profile: Looking for a husband; Real Time Geolocation/Location: U.S., New York, Manhattan; Real Time: Oct. 18, 2010 6:24 PM ET.

C. Non Network Member (640): Francesca Kilatis; Public Profile: Investment banker, basketball fan; Private Profile: Looking for a wife to her brother George Kilatis; Real Time Geolocation/Location: U.S., New York, and Manhattan still working; Real Time: Oct. 18, 2010 6:24 PM ET.

D. a group of people that include Network Members and Non Network Members (650), Real Time Geolocation/Location: U.S., New York, Manhattan, Real Time: Oct. 18, 2010 6:24 PM ET.

The sequence of Network/Space Events (610) may include:

1$^{st}$—George has arrived (arrow 611) to Madison square garden (Madison) while activating all his below profiles.

2$^{nd}$—Keira has arrived (arrow 612) to Madison while activating all her below profiles.

3$^{rd}$—Francesca knew her brother (arrow 615) is attending the match and ask her brother to let her see his space through a periscope application and replace him virtually and then saw Francesca space, realizing that maybe Francesca is looking for a social introduction rather than fans chat. The realization took place through a system "Matching Alert" which was the system outcome after creating structured content from all Francesca sources.

4$^{th}$—The system indicated (arrow 614) that Keira and Francesca share fields of interest) and this may be followed by have changed messages through the network and it ends up by all the three having a drink after the match and with set date between Keira and George.

Figure 6:
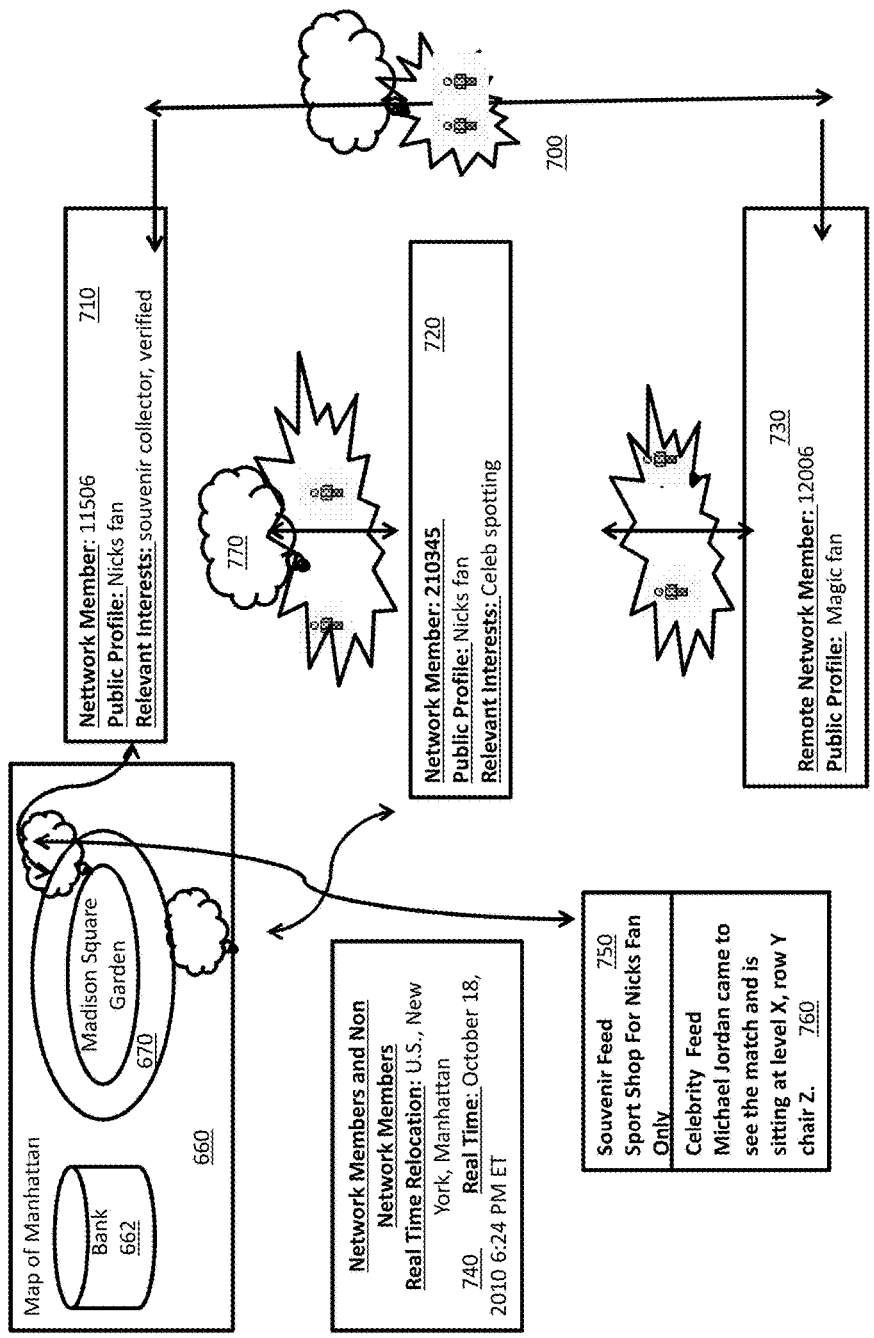
FIG. 6 illustrates various users, their geolocations/locations and information provided to them according to an embodiment of the invention.

FIG. 6 illustrates various users, their geolocations/locations and information disclosed to them.

Users 710 and 720 and nicks fans and both are proximate to the Madison square garden 670 and may be notified by the system (770) that they share fields of interest.

Users 710, 720 and 730 are basketball fans (nicks fan and Magic fan respectively) and may be notified by the system (arrows 780 and 790) that they share fields of interest.

These users can receive feeds 750 and 760 relating to their presence at the Madison square garden.

Figure 7:
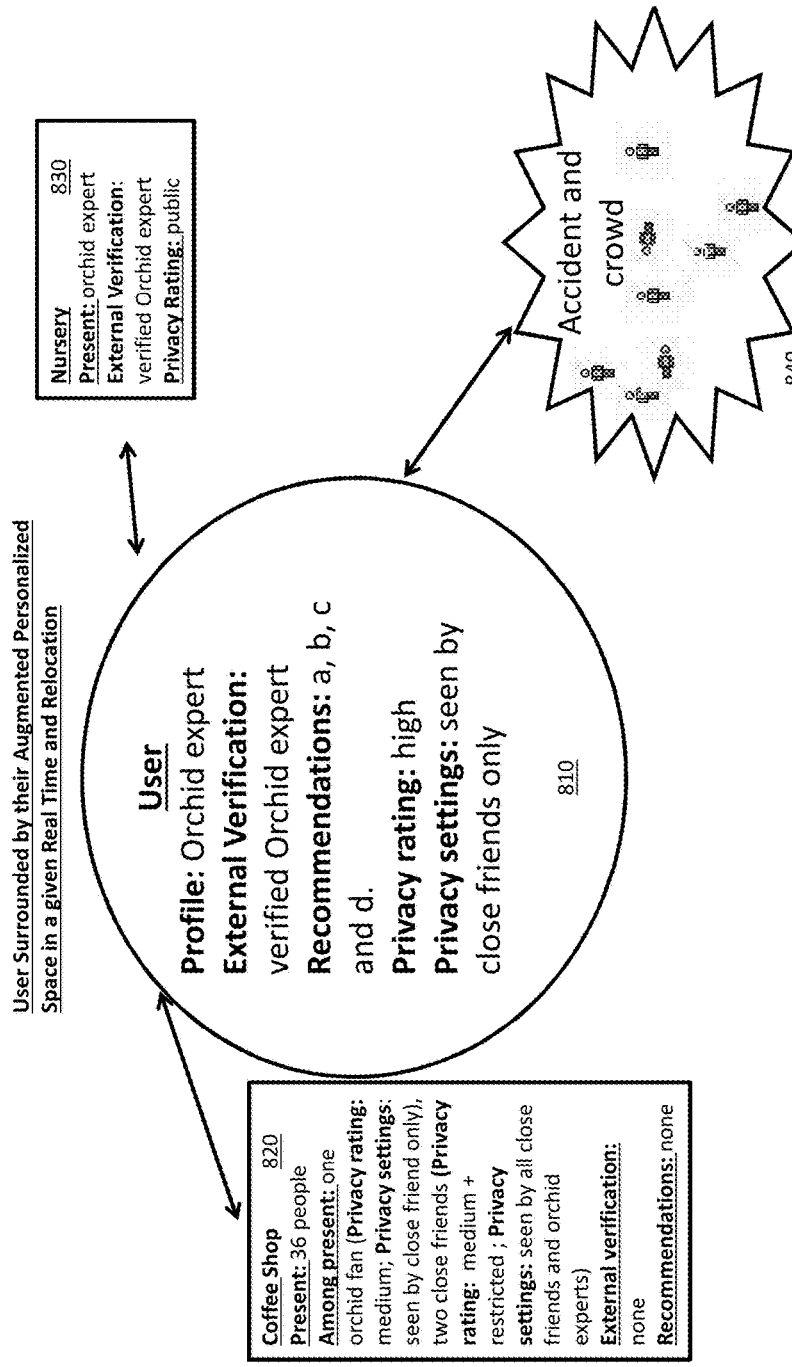
FIG. 7 illustrates a user as being surrounded by the augmented reality personalized space according to an embodiment of the invention.

FIG. 7 illustrates a user as being surrounded by the augmented reality personalized space.

The Profile 810 of the user is of an Orchid expert, it includes an External Verification: verified Orchid expert can provide Recommendations: a, b, c and d, has a High Privacy rating and has privacy settings—can be seen by close friends only.

The user can receive information about:

A. Coffee Shop 820—Present: 36 people; Among present: one orchid fan (Privacy rating: medium; Privacy settings: seen by close friend only), two close friends (Privacy rating: medium+restricted; Privacy settings: seen by all close friends and orchid experts); External verification: none; Recommendations: none.

B. Nursery 830—Present: orchid expert; External Verification: verified Orchid expert; Privacy Rating: public.

C. an accident 840—An accident can be detected by monitoring real time local feeds (such as tweeter), clustering the feed into topics, extracting geolocation/location, measuring frequency and size of topics, the system will detect and extract unusual events. The said monitoring real time local feeds might be referred to explicit or implicit signals or frequencies (e.g., mails, tweets, blogs, posts, breaking news, etc.) and for concluding the most relevant results and recommendations the system will apply, inter alia, any of the following automatic processes, contextual and/or semantic gesture and/or behavioral analysis.

There whole system described above interacts through ordered chain commands (e.g., manually, randomly, automatically and otherwise), actions and reactions each is working and activated independently in certain respects or being interacted, assisted or activated with or by other nodes, on the other end.

Figure 8:
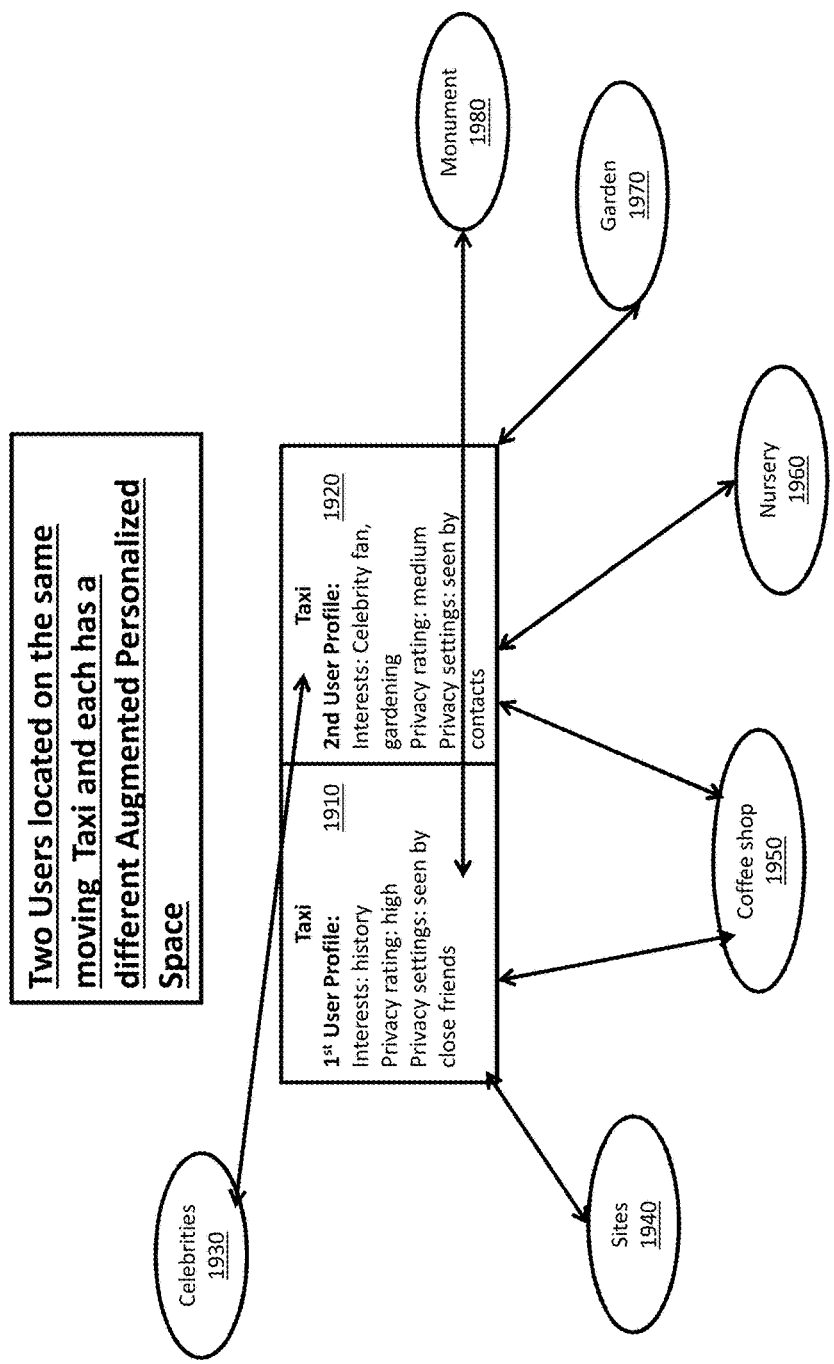
FIG. 8 illustrates two users that use the same taxi on the same real time but due to their different profiles are exposed to different information according to an embodiment of the invention.

FIG. 8 illustrates two users 1910 and 1920 that use the same taxi on the same real time but due to their different profiles they are exposed to different information.

Users 1910 and 1920 should see personalized augmented relevant digital information (based on the user profile) augmenting their surroundings. In the example one of the users can see relevant information about orchids to include places, businesses, people, favorite places in general (coffee shop), close friends around him and interesting events. User profile should include privacy policy preferences and settings. For instance public policy should allow for all users to see the person at this specific geolocation/location, restricted medium should allow all user contacts only to see him, private should allow only close friends to see him, medium should allow all contacts to see him plus a wish list of people by name, company or expertise.

The first user profile 1910 defines a region of interest as history, has a high privacy rating, and his private profile can be seen by close friends.

The second user profile 1920 defines a region of interest a celebrities and gardening, has a medium privacy rating and his private profile can be seen by contacts.

The first user can receive information about an historical monument 1980, historical sites 1940 and a coffee shop 1950.

The second user can receive information about a plant nursery 1960, a garden 1970 and the coffee shop 1950.

Figure 9:
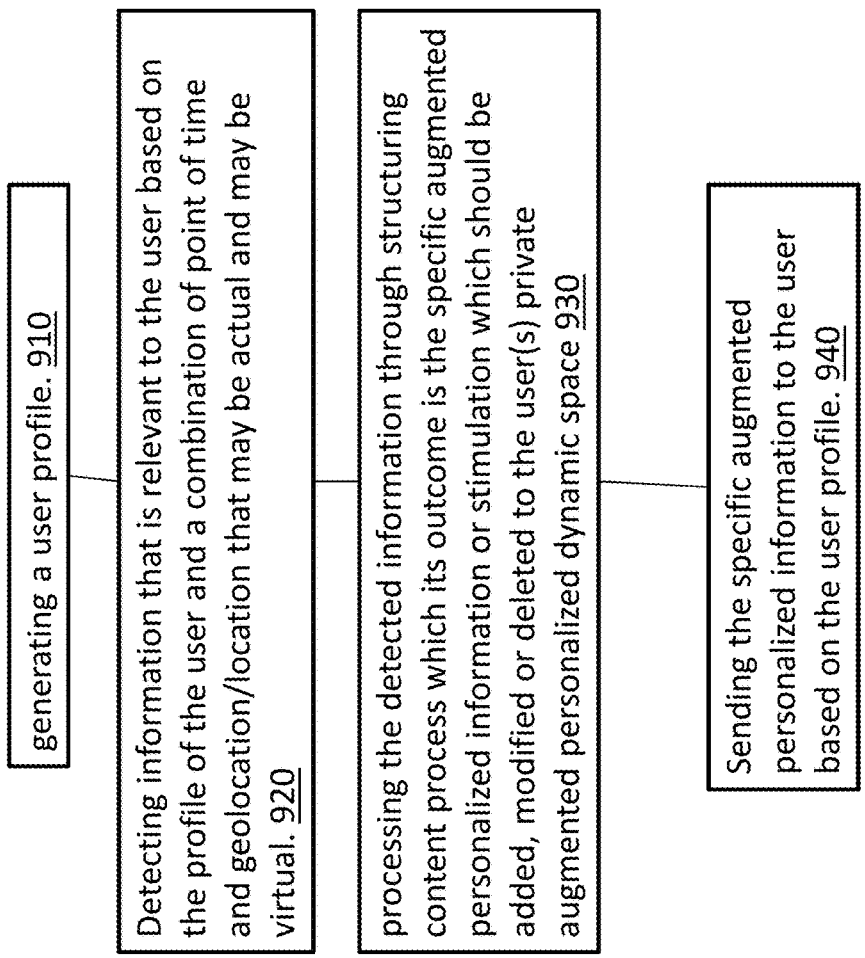
FIG. 9 illustrates an augmentation method according to an embodiment of the invention.

FIG. 9 illustrates a method according to an embodiment of the invention. The method starts by stage 910 of generating a user profile. This stage may include obtaining information from social networks, web sites, user device and the user and/or from any other information source.

The method continues to stage 920 of detecting information that is relevant to the user based on the profile of the user and a combination of point of time and geolocation/location that may be actual and may be virtual (such as past or future).

Stage 920 is followed by stage 930 by processing the detected information through structuring content process which its outcome is the specific augmented personalized information or stimulation which should be added, modified or deleted to the user(s) private augmented personalized dynamic space.

Stage 930 is followed by stage 940 of sending the specific augmented personalized information to the user based on the user profile.

According to various embodiments of the invention dynamic user profiles can be automatically generated using different methods: (i) extraction and aggregation of user generated profiles from other social networks to include name, aliases, education, hobbies, bio, etc. (ii) Monitoring public feeds (or private feeds) such as twitter, google+, facebook, foursquare to detect likes, retweets, shared links, comments, reviews, (iii) selection, etc. in order to deduce current topics of interest, preferences and social graph.

The system can determine, by extracting the topics from shared links using topic detection algorithms, identifying places the user most checked-in, extracting sentiment from comments and reviews using sentiment extraction algorithms, identifying influencers from likes by analyzing users who get most likes, shares, retweets, and follow, the current user topics, people and places of interest to derive and build a personalized profile.

The user can manually edit and overwrite and of the settings and preferences.

The system can constantly monitor public real time feeds and sites such as twitter, google+, news sites, Quora, yelp, other Users' information and data, including but not limited to, their profiles or augmented space, or cloning wholly or partially their identity, profile or augmented space, etc. to extract local information for a list of geolocations/locations. Information such as reviews, recommendations, breaking news, sale, etc. The information will be analyzed, normalized and structured creating a real time geolocation/location profile.

Geolocations/Locations (with related data), such as, sites, businesses, points of interest will be extracted from the feeds using geographic databases and business directories to form lists. The data will be analyzed to extract latest reviews and sentiments. The data can be normalized into a structured format using entity extraction algorithms (to be matched against user's preferences and other parameters). For example, a restaurant reviews, critics and ratings will be structured into attributes such as food type, size of dishes, quality of ingredients, prices, people likes and choices, etc.

A repository of geolocation/location static based information with references to online maps, directories, historical information and more can be generated and maintained.

Environmental sensors can provide upon request real time updates on weather, pollution, noise level, density, etc. to help further filter local data, in addition people nearby will be identified. For example if it is raining (weather sensor) a restaurant recommended for its patio will not show as preference.

Pursuant to a user request that will be triggered either automatically based on user geolocation/location change, manually or randomly, a user profile will be retrieved and matched against the geolocation/location profiles to provide customized relevant geolocation/location data.

A real time feed will streamline to the user device and will be filtered against personal sensors such as people in group, clothes, mood, etc. The user will get to his device the most relevant, refined, precise real time digital information that can be overlaid with his physical space.

Personal filters can be used in real time to filter the data against user information. People in group can be detected using mobile detection, face recognition or voice recognition. Mood can be detected using for example face recognition techniques. For privacy and security purposes, this information will not reside or stored on any server and will be filtered on the user device.

Figure 10:
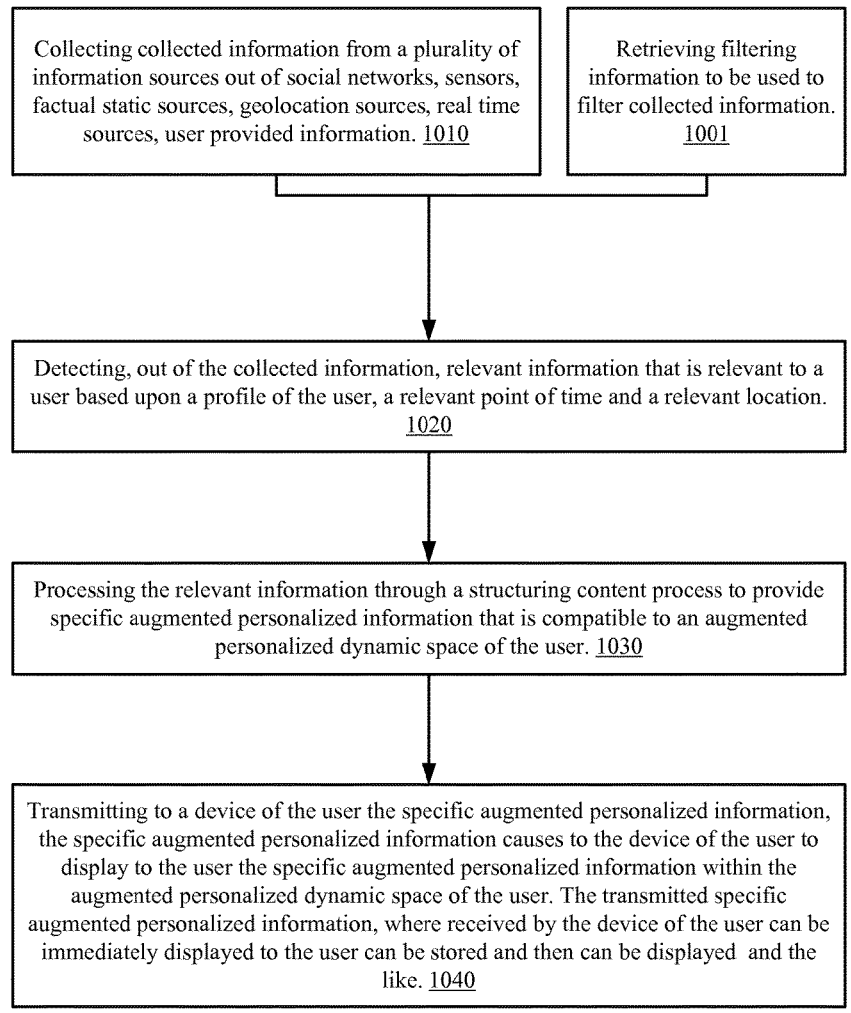
FIG. 10 illustrates a method according to an embodiment of the invention.

FIG. 10 illustrates method 1000 according to an embodiment of the invention.

Method 1000 may include stages 1001, 1010, 1020, 1030 and 1040.

Stage 1001 retrieving filtering information to be used to filter collected information.

Stage 1010 may include collecting collected information from a plurality of information sources out of social networks, sensors, factual static sources, geolocation/location sources, real time sources, user provided information.

Stage 1020 may include detecting, out of the collected information, relevant information that is relevant to a user based upon a profile of the user, a relevant point of time and a relevant geolocation/location.

Stage 1030 may include processing the relevant information through a structuring content process to provide specific augmented personalized information that is compatible to an augmented personalized dynamic space of the user.

Stage 1040 may include transmitting to a device of the user the specific augmented personalized information, the specific augmented personalized information causes to the device of the user to provide and display to the user the specific augmented personalized information within the augmented personalized dynamic space of the user. The transmitted specific augmented personalized information, where received by the device of the user can be immediately displayed to the user can be stored and then can be displayed and the like.

FIGS. 11-12 illustrates some of the sub-stages that may be includes in the various stages of method 1000.

Stage 1001 may include at least one of the following: retrieving (1002) the relevant point of time and the relevant geolocation/location from time and geolocation/location sensors; retrieving (1004) from the augmented personalized dynamic space of the user at least one of relevant time and the relevant geolocation/location which is virtual; randomly selecting (1006) at least one of the relevant point of time and the relevant geolocation/location; and randomly selecting (1008) at least one of the relevant point of time and the relevant geolocation/location.

Stage 1010 may include at least one of the following: collecting (1012) collected information obtained from public profiles of multiple users; constantly collecting (1014) collected information from local and global cyber space and from sensors that sense physical attributes of an environment of the user;

Stage 1020 may include at least one of the following: detecting (1022) of relevant information to the user in response to a correlation between a profile of the user and at least public profiles of other users; determining (1024) that uses share a field of interest based upon a similarity between profiles of the users and geolocations/locations that are relevant to the users; and determining (1028) a scope, strength, relevancy and priority of attributes of the user profile based on personal sensors.

Stage 1040 may include at least one of the following: transmitting (1042) to the device of the user specific augmented personalized information that will cause the device of the user to suggest services proximate to the geolocation/location of interest and in correlation with the profile of the user; transmitting (1044) to the device of the user specific augmented personalized information that will cause the device of the user to provide an indication to the user that at least one other user that is located at a vicinity of the user has a field of interest that is similar to a field of interest of the user; transmitting (1046) to device of the user specific augmented personalized information that causes the device of the user to provide an event notification, wherein the event notification is sent to each user that is proximate to a geolocation/location of the event and has a profile that indicates that the event is related to a field of interest of the user.

As indicated above—the invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it is possible that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims the term "location" also refers to geolocation.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium for displaying augmented personalized information to a user, the non-transitory computer readable medium stores instructions for: collecting collected information from a plurality of information sources out of social networks, sensors, location sources, real time sources, user provided information; detecting, out of the collected information, relevant information that is relevant to a user based upon a profile of the user, a relevant point of time and a relevant location; processing the relevant information through a structuring content process to provide specific augmented personalized information that is compatible to an augmented personalized dynamic space of the user; and transmitting to a device of the user the specific augmented personalized information, the specific augmented personalized information causes to the device of the user to display to the user the specific augmented personalized information within the augmented personalized dynamic space of the user; wherein the user profile comprises a private or limited profile and a public profile, wherein the public profile is accessible only to other users that have similar public profiles to the public profile of the user.

2. The non-transitory computer readable medium according to claim 1 that stores instructions for retrieving the relevant point of time and the relevant location from time and location sensors.

3. The non-transitory computer readable medium according to claim 1, wherein at least one of the relevant point of time and the relevant location is virtual and is retrieved from the augmented personalized dynamic space of the user.

4. The non-transitory computer readable medium according to claim 1, wherein the user profile comprises a private profile and a public profile, the public profile is accessible to other users.

5. The non-transitory computer readable medium according to claim 4 that stores instructions for providing collected information obtained from public profiles of multiple users.

6. The non-transitory computer readable medium according to claim 1 that stores instructions for detecting of relevant information to the user in response to a correlation between a profile of the user and at least public profiles of other users.

7. The non-transitory computer readable medium according to claim 1 that stores instructions for constantly collecting the collected information from local and global cyber space and from sensors that sense physical attributes of an environment of the user.

8. The non-transitory computer readable medium according to claim 1 that stores instructions for randomly selecting at least one of the relevant point of time and the relevant location.

9. The non-transitory computer readable medium according to claim 1 that stores instructions for transmitting to the device of the user the specific augmented personalized information, the specific augmented personalized information causes to the device of the user to suggest to the user services proximate to the location of interest and in correlation with the profile of the user.

10. The non-transitory computer readable medium according to claim 1 wherein the relevant point in time is a future point in time.

11. The non-transitory computer readable medium according to claim 1, wherein the relevant location comprising a path between a target location to a destination location.

12. The non-transitory computer readable medium according to claim 1 that stores instructions for transmitting to the device of the user the specific augmented personalized information, the specific augmented personalized information causes to the device of the user to provide an indication to the user that at least one other user that is located at a vicinity of the user has a field of interest that is similar to a field of interest of the user.

13. The non-transitory computer readable medium according to claim 1 that stores instructions for determining that uses share a field of interest based upon a similarity between profiles of the users and locations that are relevant to the users.

14. The non-transitory computer readable medium according to claim 1 that stores instructions for transmitting to devices users specific augmented personalized information tailored to each of the users, the specific augmented personalized information of each user causes a device of the user to provide an event notification, wherein the user are proximate to a location of the event and having profiles that indicate that the event is related to a field of interest of the users.

15. The non-transitory computer readable medium according to claim 1 that stores instructions for detecting an occurrence of an event by monitoring real time local feeds, and detecting the occurrence of the event based upon a frequency of the real time local feeds.

16. The non-transitory computer readable medium according to claim 1, wherein the detecting of the relevant information comprises determining scope, strength, relevancy and priority of attributes of the user profile based on personal sensors.

17. The non-transitory computer readable medium according to claim 1 that stores instructions for transmitting to a device of another user the specific augmented personalized information of the user.

18. The non-transitory computer readable medium according to claim 1, wherein the characteristics of the user form a profile of the user.

19. The non-transitory computer readable medium according to claim 1 that stores instructions for receiving, from a user, edited settings and preferences of a user profile and updating the user profile.

20. The non-transitory computer readable medium according to claim 1 that stores instructions for triggering randomly, a retrieval of a user profile, and a match of the user profile against a geolocation profile to provide a customized relevant geolocation data.

21. The non-transitory computer readable medium according to claim 1 that stores instructions for enabling a user to adjust and customize system settings.

22. The non-transitory computer readable medium according to claim 21 wherein the system settings comprise augmented reality features.

23. The non-transitory computer readable medium according to claim 1 wherein the augmented personalized dynamic space of the user represents a space at the relevant point of time and at the relevant location.

24. A method for displaying augmented personalized information to a user, the method comprises: collecting, by a computerized system, collected information from a plurality of information sources out of social networks, sensors, factual static sources, geolocation sources, real time sources, user provided information; detecting, out of the collected information and by the computerized system, relevant information that is relevant to a user based upon a profile of the user, a relevant point of time and a relevant location; processing, by the computerized system, the relevant information through a structuring content process to provide specific augmented personalized information that is compatible to an augmented personalized dynamic space of the user; and transmitting to a device of the user the specific augmented personalized information, the specific augmented personalized information causes to the device of the user to display to the user the specific augmented personalized information within the augmented personalized dynamic space of the user; wherein the user profile comprises a private or limited profile and a public profile, wherein the public profile is accessible only to other users that have similar public profiles to the public profile of the user.

25. A computerized system for displaying augmented personalized information to a user, the computerized system comprising: a collection module for collecting collected information from a plurality of information sources out of social networks, sensors, factual static sources, geolocation sources, real time sources, user provided information; a detector for detecting, out of the collected information, relevant information that is relevant to a user based upon a profile of the user, a relevant point of time and a relevant location; a processor for processing the relevant information through a structuring content process to provide specific augmented personalized information that is compatible to an augmented personalized dynamic space of the user; and a transmitter for transmitting to a device of the user the specific augmented personalized information, the specific augmented personalized information causes to the device of the user to display to the user the specific augmented personalized information within the augmented personalized dynamic space of the user; wherein the user profile comprises a private or limited profile and a public profile, wherein the public profile is accessible only to other users that have similar public profiles to the public profile of the user.

\* \* \* \* \*